United States Patent
Zheng

(10) Patent No.: US 8,917,914 B2
(45) Date of Patent: Dec. 23, 2014

(54) FACE RECOGNITION SYSTEM AND METHOD USING FACE PATTERN WORDS AND FACE PATTERN BYTES

(75) Inventor: Yufeng Zheng, Clinton, MS (US)

(73) Assignee: Alcorn State University, Alcorn State, MS (US)

(\*) Notice: Subject to any disclaimer, the term of this patent is extended or adjusted under 35 U.S.C. 154(b) by 120 days.

(21) Appl. No.: 13/506,224

(22) Filed: Apr. 5, 2012

(65) Prior Publication Data

US 2012/0257800 A1    Oct. 11, 2012

Related U.S. Application Data

(60) Provisional application No. 61/516,554, filed on Apr. 5, 2011.

(51) Int. Cl.
*G06K 9/36* (2006.01)
*G05B 19/00* (2006.01)
*G06K 9/00* (2006.01)
*G06K 9/52* (2006.01)

(52) U.S. Cl.
CPC ............ *G06K 9/00275* (2013.01); *G06K 9/527* (2013.01)
USPC .......................... 382/118; 382/284; 340/5.53

(58) Field of Classification Search
USPC .......... 382/118, 115, 117, 128, 284; 340/575, 340/5.53, 5.83
See application file for complete search history.

(56) References Cited

U.S. PATENT DOCUMENTS

| | | | |
|---|---|---|---|
| 6,996,256 B2 * | 2/2006 | Pavlidis | 382/118 |
| 8,224,042 B2 * | 7/2012 | Wang | 382/118 |
| 8,442,279 B2 * | 5/2013 | Yan et al. | 382/118 |
| 2012/0250948 A1 * | 10/2012 | Rickman | 382/115 |

\* cited by examiner

*Primary Examiner* — Sheela Chawan
(74) *Attorney, Agent, or Firm* — Lawrence Arthur Schemmel

(57) ABSTRACT

The present invention provides a novel system and method for identifying individuals and for face recognition utilizing facial features for face identification. The system and method of the invention comprise creating facial features or face patterns called face pattern words and face pattern bytes for face identification. The invention also provides for pattern recognitions for identification other than face recognition. The invention further provides a means for identifying individuals based on visible and/or thermal images of those individuals by utilizing computer software implemented by instructions on a computer or computer system and a computer readable medium containing instructions on a computer system for face recognition and identification.

35 Claims, 9 Drawing Sheets
(5 of 9 Drawing Sheet(s) Filed in Color)

| BT4_H4 OriCode (Band 8) | BT4_L4 OriCode (Band 7) | BT3_H4 OriCode (Band 6) | BT3_L4 OriCode (Band 5) | BT2_H4 OriCode (Band 4) | BT2_L4 OriCode (Band 3) | BT1_H4 OriCode (Band 2) | BT1_L4 OriCode (Band 1) |
|---|---|---|---|---|---|---|---|

Figure 2C

| BT1_H4 Mode of Band 5-8 | BT1_L4 Mode of Band 1-4 |

Figure 2D

FACE RECOGNITION SYSTEM AND METHOD USING FACE PATTERN WORDS AND FACE PATTERN BYTES

CROSS-REFERENCE TO RELATED APPLICATION

This application claims priority from U.S. Provisional Patent Application Ser. No. 61/516,554 filed Apr. 5, 2011. The entirety of that provisional application is incorporated herein by reference.

STATEMENT OF GOVERNMENT SUPPORT

This invention was made in part with government support under Contract No. DE-AC05-00OR22725 awarded by the United States Department of Homeland Security, Southeast Region Research Initiative at the U.S. Department of Energy's Oak Ridge National Laboratory. The government may have certain rights in the invention.

FIELD OF THE INVENTION

This invention relates to the field of individual identification and more specifically to the field of face recognition and a system and method of utilizing face features for fast and efficient face identification. The system and method of the invention comprise creating face pattern words and face pattern bytes for face identification. The invention provides a computer software means for accurate face recognition using visible and/or thermal images.

BACKGROUND OF THE INVENTION

The present invention generally relates to the technical field of face recognition. More particularly, the invention involves the creation of facial features, termed "face pattern words" and "face pattern bytes", used for face identification. The invention provides a means for identifying individuals based on visible and/or thermal images of those individuals by utilizing software systems and methods implemented by instructions on a computer system and a computer readable medium containing instructions on a computer system for face identification. The invention and its optimal orientation bit code and optimized binary coding can also be used for other pattern recognitions such as fingerprint recognition, iris recognition, and the like.

Many challenges exist for face recognition using currently-available techniques. Compared to iris or fingerprint recognition, current face recognition technology has relatively low identification rate and slow recognition speed due to high algorithm complexity and large image size. However, methods using iris or fingerprint image acquisition are time-consuming and require the subject's collaboration. The present invention provides a novel system and methodology of face identification using face pattern words and face pattern bytes.

Many algorithms have been developed in the face recognition domain over the past two decades. Three common algorithms (according to NIST) are Principle Component Analysis (PCA), Linear Discriminant Analysis (LDA), and Elastic Bunch Graph Matching (EBGM) and are briefly summarized as follows. PCA is used for dimensionality reduction to find the eigenvectors which best account for the distribution of all face images in a database. These eigenvectors are commonly referred to as eigenfaces. The number of eigenfaces depends on a particular implementation and the database images. For example, the number of eigenfaces may be up to 100. All faces, including the training images (in the database) and the probe image, are projected onto eigenfaces to find a set of weights (feature vector) for each face. Each weight in a set actually describes the contribution of the corresponding eigenface. Identification of a face image means to find the closest face (i.e., feature vector) in the database according to a distance measure. A PCA algorithm typically requires frontal face images and all images should have the same size and line up the eyes and mouth of the subjects. Unlike PCA, LDA is used to find an efficient way to represent the faces using the face class information. The Fisherface algorithm is derived from the Fisher Linear Discriminant, which uses class specific information. By defining different classes with different statistics, the images in the training set are divided into the corresponding classes. Then techniques similar to the PCA algorithm are applied. The Fisherface algorithm results in a higher accuracy rate in recognizing faces when compared with the Eigenface algorithm. In the EBGM algorithm, faces are represented as graphs, with nodes positioned at fiducial points (such as the eyes, tip of nose, and mouth), and edges are labeled with 2-D distance vectors. Each node contains a set of 40 complex Gabor wavelet coefficients, including both phase and magnitude, known as a jet. Wavelet coefficients are extracted using a family of Gabor kernels with 5 different spatial frequencies and 8 orientations. A graph is labeled using a set of nodes connected by edges, where nodes are labeled with jets and edges are labeled with distances. Thus, the geometry of a face is encoded by the edges whereas the gray value distribution is patch-wise encoded by the nodes (jets). To identify a probe face (also called query face), the face graph is positioned on the face image using elastic bunch graph matching, which actually maximizes the graph similarity function. After the graph has been positioned on the probe face, it can be identified by comparing the similarity between the probe face and each face stored in the database (referred to as gallery face thereafter). From the literature reports regarding the comparisons of these three common algorithms, it seems that the EBGM algorithm is the best in terms of identification rate and performance reliability.

The performance of face recognition using visible imagery depends much on the illumination conditions, which can dramatically reduce performance with poor illumination, especially at nighttime. To address the limitations of using visible face images, recently researchers have begun investigating face recognition approaches using thermal (long wave infrared, LWIR) images or the fusion of both thermal and visible images. Buddharaju et al. proposed to localize the superficial vessel network using thermal images and then to extract the branching points (referred to as Thermal Minutia Points) from the vascular network as features for face recognition. Similar work was reported by Akhloufi and Bendada, where blood vessels were used as a thermal faceprint. Bebis et al. suggested two fusion schemes for eigenface recognition, i.e., pixel-based and feature-based fusion of visible and thermal imagery. Arandjelovic et al. proposed a decision level fusion of visual and thermal images. Both experimental results showed improvement using fusion and revealed a performance decrease when eyeglasses were present in the image. However, thermal face recognition has not been sufficiently investigated, especially in the fields of face pattern representation and recognition algorithms.

As mentioned, face recognition techniques (like PCA, LDA, and EBGM) using visible images are very much restricted by the illumination conditions. The face recognition system and method of present invention was originally developed on thermal face images and later extended to visible images. Although other face recognition methods exist (like thermal faceprint) using thermal images, those methods have not been sufficiently tested on a large database and none have been tested using both visible and thermal images. The face recognition system and method of the present invention can identify a subject using either a thermal image (both daytime and nighttime) or using a visible image (daytime), which can be applied to any field 24 hours a day regardless of illumination conditions.

U.S. Pat. No. 6,563,950 discloses an image analysis method called "labeled bunch graph" that can be used for face recognition called elastic bunch graph match or EBGM. Gabor wavelet transforms (GWT) with 5 frequencies and 8 orientations are applied to each face image. A similarity metric between two face images is defined with a number of GWT magnitudes that are extracted from the predefined nodes on each face image. A probe face is identified by the gallery face that has the largest similarity value (i.e., the most similar to the probe face). However in the present invention, GWT coefficients are used for facial feature extraction but the GWT coefficients with 8 frequencies and 16 orientations are applied to each face image. Moreover for the present invention, the index of the maximal GWT magnitude among 16 orientations at each frequency band is extracted then encoded as a 4-bit orientation bit code. Eight (8) sets of 4-bit orientation bit code are put into a 32-bit face pattern word (pixel by pixel) and the 4-bit orientation bit code is optimized with respect to Hamming Distance (HD). A probe face is identified by the gallery face that has the smallest HD value.

U.S. Pat. No. 7,860,280 describes a face detection method by locating the facial features (i.e., eyes, nose, mouth) from a color face image (visible image). However, no specific face recognition technique is provided in that technology.

U.S. Pat. No. 7,873,189 discloses a face recognition method using a support vector machine (SVM) classifier. A face image is divided into three sections in horizontal and vertical directions, respectively. Then PCA (principle component analysis) and LDA (linear discriminant analysis) are applied to the six divided images, the resulted feature vector of each divided image is compared with the feature vector stored in a database in advance to calculate a similarity value. A new feature vector is formed with the six similarity values and is used to train a SVM classifier to face recognition. This classifier-based (SVM) face recognition method is completely different from the present invention which utilizes Gabor wavelet transforms for feature extraction and uses Hamming Distance for face matching.

U.S. Pat. No. 7,876,931 describes a face recognition method that models a 3D face using a 3D camera, then derives a number of 2D face images from the 3D face model and enrolls the 2D images into a database. The derived 2D face images are used to match with the probe face images from a regular video camera. However, no specific face recognition technique is provided by this technology.

The face recognition system and method of the present invention uses Gabor wavelet transforms (GWT) to create face patterns (FPWs and FPBs), which is similar to the EBGM method. However, the EBGM method extracts the facial features from GWT coefficients at a number of fiducial points (about 31 points surrounding the eyes, tip of nose, and mouth). Locating the fiducial points on each face image is extremely time-consuming. The similarity function used in EBGM involves complicated float-number computations that slow down the face matching process. In the present invention, the face patterns (FPWs and FPBs) are simplified from GWT coefficients by using order statistics. The FPWs and FPBs comprise integer numbers. Furthermore, the Hamming Distance used for face matching mainly involves logical computations (AND, XOR), which expedite the face recognition process. It is also viable to implement a real-time face recognition system by using the present invention with proper hardware support.

Therefore, there exists a need for an accurate and efficient face recognition system and method using facial features for identification. The present invention provides such a system and method and software means for fast, accurate, and efficient face recognition.

SUMMARY OF THE INVENTION

The present invention provides a novel system and method for face recognition that utilize face features for fast, accurate, and efficient face identification. An embodiment of the system and method of the invention creates and uses "face pattern words" (FPWs) and "face pattern bytes" (FPBs) for face identification. The FPWs and FPBs are sets of face patterns created from a face image. The FPWs and FPBs are then used for face identification and the identification rate and recognition speed using FPWs and FPBs are significantly improved. The face images can be either visible images (RGB, for example) or thermal images (long wave infrared, i.e., LWIR, for example). Another embodiment of the present invention provides a computer software means for accurate face recognition using visible and/or thermal images. The invention provides a computer readable medium having instructions on a computer or computer system for accurate and efficient face identification.

With the foregoing and other objects, features, and advantages of the present invention that will become apparent, the nature of the invention may be more clearly understood by reference to the following detailed description of the invention and to the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These drawings accompany the detailed description of the invention and are intended to illustrate further the invention and its advantages:

FIG. 2C is an illustration of the creation of face pattern words (FPWs) of the present invention showing a 32-bit FPW filled with the orientation bit code along eight (8) frequency bands.

FIG. 2D is an illustration of the creation of face pattern bytes (FPBs) of the present invention showing an 8-bit FPB filled with the orientation bit code along eight (8) frequency bands.

DETAILED DESCRIPTION OF THE INVENTION

The present invention is directed to and provides a novel system and method for identifying individuals and specifically for face recognition utilizing facial features for face identification. The system and method of the invention comprise creating and utilizing at least one set of face patterns comprising face pattern words and/or face pattern bytes for face identification.

Further, the invention provides a means for identifying individuals based on visible and/or thermal images of those individuals utilizing computer software implemented by instructions on a computer or computer system and a computer readable medium containing instructions on a computer system for such face recognition and identification. The invention and its optimal orientation bit code and optimized binary coding can also be used for other pattern identifications and recognitions such as fingerprint recognition, iris recognition, and the like.

In iris recognition, the phase information of Gabor wavelet transform (GWT) coefficients within the iris ring are coded into 2048 bits (at 2 bits per pixel), referred to as iris code. Inspired by the iris code, the present invention uses the magnitudes of GWT coefficients to create an n-bit (n=12-32) "face pattern word" (FPW) for each pixel on a face image, then the Hamming Distance (HD) is computed and compared for face identification. A FPW can be further reduced down to an n-bit (n=6-8) "face pattern byte" (FPB). The novel procedure of face recognition using face pattern words and face pattern bytes is depicted in Section 1 and all key steps are fully described in Sections 2-4. The experimental results are presented in Section 5 and a summary is given in Section 6. The term frequency(ies) as used herein regarding the invention refers to frequency(ies) in the spatial domain.

Figure 1:
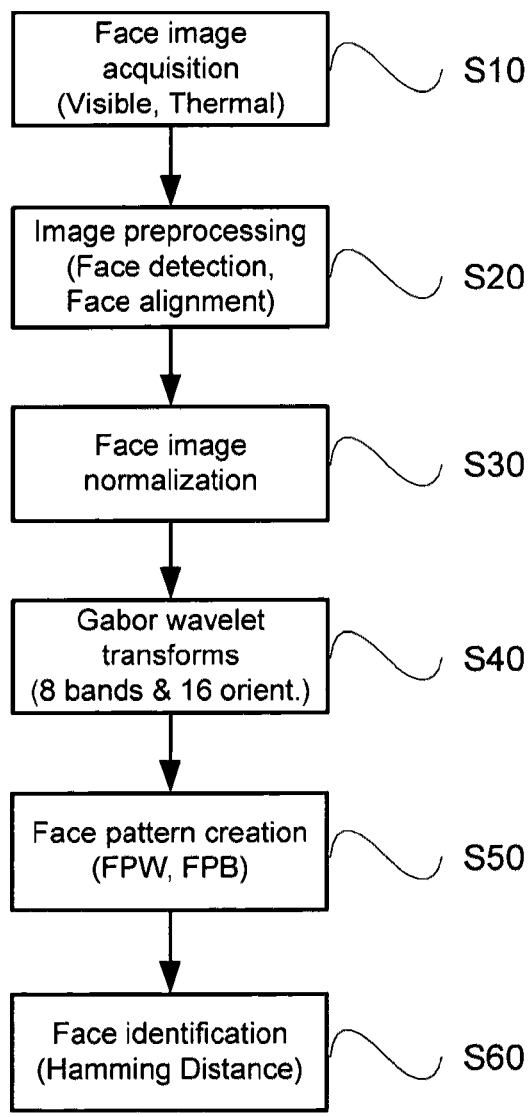
FIG. 1 is a diagrammatic representation of the face recognition system and method of the invention.

1. The Procedure of the Face Recognition System and Method Using Face Pattern Words and Face Pattern Bytes FIG. 1 shows a diagrammatic representation of the face recognition system and method of the invention, where S10 through S60 corresponds to (1) through (6) below, respectively. The system inputs are at least one visible image (RGB, for example) and/or one thermal image (LWIR, for example) from a probe (camera), whereas the system output provides at least one identified face image. A complete process of the method and system of face recognition of the invention comprises image preprocessing, face image normalization, Gabor wavelet transforms (8 frequency bands and 16 orientations), face pattern creation (FPWs, FPBs), and face identification using Hamming Distance.

1) Face image acquisition: The face images are acquired either using a thermal camera (preferably with a FLIR SC620, for example), or using a standard digital camera (for visible face images). The face image acquisition process is not a part of the present invention.

2) Image preprocessing: All faces must be extracted (cropped) from the acquired images such that only one head (face) is included in each image, called a face image. All face images (including probe faces and gallery faces) must be then aligned (by proper scaling, rotation, and translation) according to the face landmarks (such as eyes, nose, and mouth, for example) before proceeding to the following steps. A probe face is a face image acquired in real time at an application field (e.g., at airports). Gallery faces are the face images acquired off-site and pre-stored in a pre-existing database and are not real-time images. The image database contains at least one gallery face image of one or more subjects. The face patterns (i.e., FPWs and FPBs) of those gallery faces are usually computed and also pre-stored in the database to speed up the process of face recognition. The face image extraction and alignment are necessary preparation steps (of face recognition), but are not parts of the present invention.

3) Face image normalization: To obtain a consistent dynamic image range and/or contrast, the visible/thermal face images are normalized as follows, $$I_N = (I_o - \mu_o)/\sigma_o, \qquad (1)$$

where $I_N$ is the normalized image, $I_o$ is the original image; and $\mu_o$ and $\sigma_o$ denote the mean and standard deviation of the original image, respectively.

4) Gabor wavelet transforms (GWT): The GWT (e.g., with 8 spatial frequencies by 16 orientations) are performed with each face image.

5) Face pattern creation: Choose one face pattern, or at least one set of face patterns, from the following for the face identification process:

a) A 32-bit face pattern word is created pixel-by-pixel using GWT coefficients, which is referred to as face pattern words (FPWs).

b) An 8-bit face pattern byte is created pixel-by-pixel using GWT coefficients, which is referred to as face pattern bytes (FPBs). The FPBs can be also extracted from the stored FPWs (if available).

6) Face identification: The Hamming Distance (HD) between a probe face and each gallery face is calculated by using their FPWs or FPBs. The probe face is identified as the gallery face stored in a pre-existing database having the smallest HD.

2. Gabor Wavelet Transforms

In biometrics studies, Gabor wavelet transforms have been successfully applied to the recognitions of fingerprints, irises, and faces. These two-dimensional (2D) band-pass filters have been shown to possess optimal localization properties in both spatial and frequency domains, and thus are well-suited for extracting the subtle features on a face image lying in a specific frequency range and orientation.

A Gabor wavelet can be viewed as a sinusoidal plane of particular frequency and orientation, modulated by a Gaussian envelope. It can be written as follows:

$$g(x, y) = e^{-\frac{1}{2}\left[\frac{x^2}{\sigma_x^2} + \frac{y^2}{\sigma_y^2}\right]} e^{-j2\pi(u_0 x + v_0 y)}. \qquad (2)$$

In the Fourier frequency domain (u, v), the filter's response consists of two 2D Gaussian functions (due to the conjugate symmetry on the spectrum) that are:

$$G(u, v) = G_1 + G_2 = e^{-\frac{1}{2}\left[\frac{u_1^2}{\sigma_u^2} + \frac{v_1^2}{\sigma_v^2}\right]} + e^{-\frac{1}{2}\left[\frac{u_2^2}{\sigma_u^2} + \frac{v_2^2}{\sigma_v^2}\right]}, \qquad (3)$$

where $\sigma_u=1/(2\pi\sigma_x)$ and $\sigma_v=1/(2\pi\sigma_y)$ are the standard deviation along two orthogonal directions (which determines the width of the Gaussian envelope along the x- and y-axes in the spatial domain), and assumes that the origin of the Fourier transform has been centered. The intermediate variables are defined as follows:

$$u_1=(u-f\cos\theta)\cos\theta+(v-f\sin\theta)\sin\theta, \quad (4a)$$

$$v_1=-(u-f\cos\theta)\cos\theta+(v-f\sin\theta)\sin\theta, \quad (4b)$$

$$u_2=(u+f\cos\theta)\cos\theta+(v+f\sin\theta)\sin\theta, \quad (4c)$$

$$v_2=-(u+f\cos\theta)\cos\theta+(v+f\sin\theta)\sin\theta, \quad (4d)$$

where f determines the central frequency of the pass band in orientation $\theta$. Of course, we have $\theta=\tan^{-1}(v_0/u_0)$ and $f=\sqrt{u_0^2+v_0^2}$, where $(u_0, v_0)$ is the center of a Gaussian function (say $G_1$) in Eq. (2).

Figure 2A:
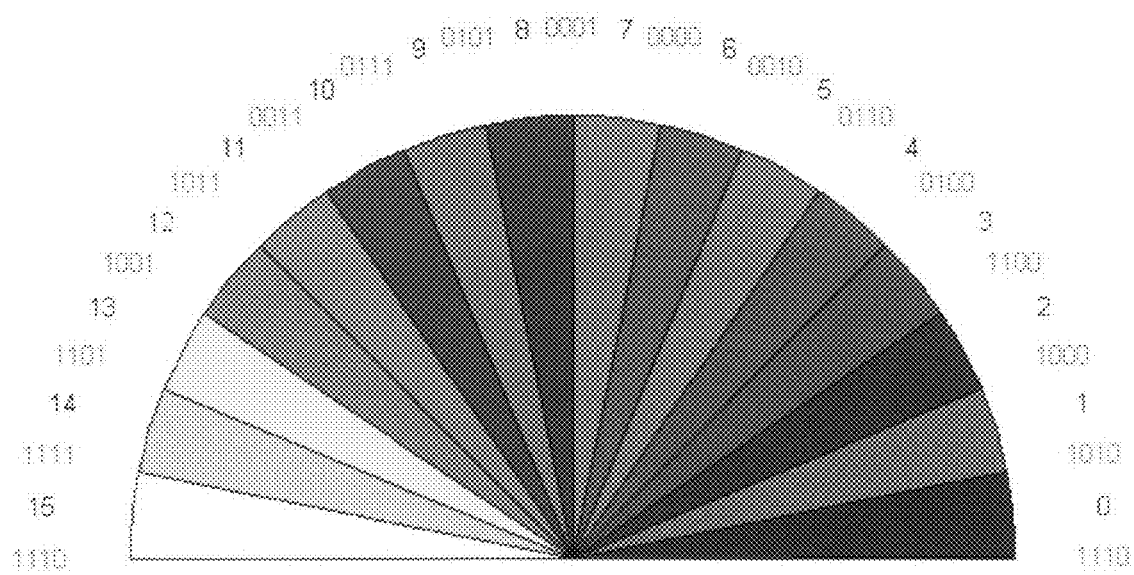
FIG. 2A is a pictorial illustration of the creation of face pattern words (FPWs) and face pattern bytes (FPBs) of the present invention showing sixteen (16) orientations (0-15) and their color code corresponding to their orientational bit code.
Figure 2B:
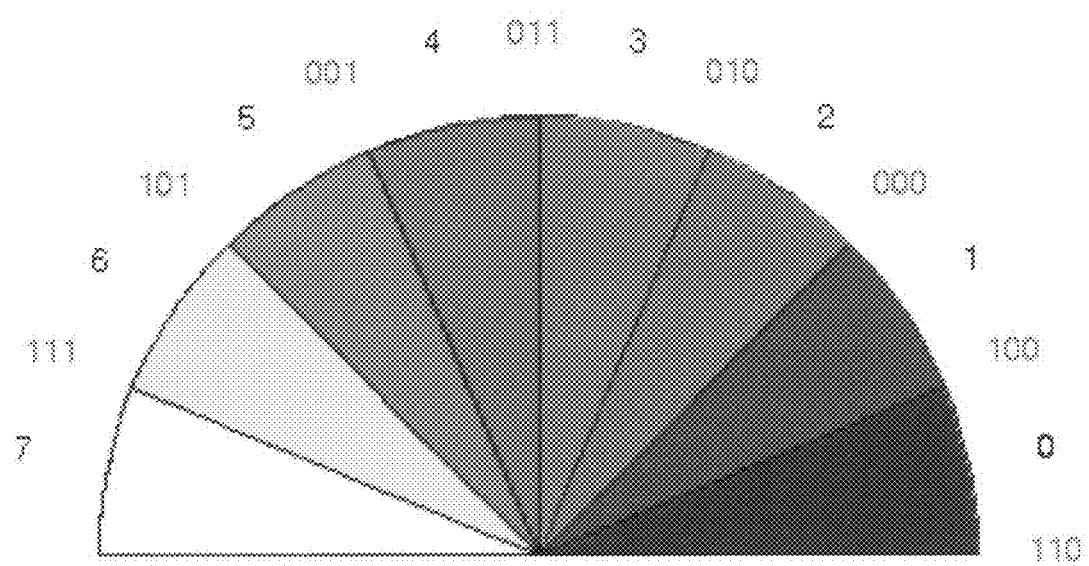
FIG. 2B is a pictorial illustration of the creation of face pattern words (FPWs) and face pattern bytes (FPBs) of the present invention showing eight (8) orientations (0-7) and their color code corresponding to their orientational bit code.

FIGS. 2A-D shows an illustration of orientation code and face pattern creation. FIG. 2A shows 16 orientations (0-15) and their color code corresponding to their orientational bit code (in red font: $d_{nbr}^{BC}=32$, and $d_{oth}^{BC}=64$). FIG. 2B shows 8 orientations (0-7) and their color code corresponding to their orientational bit code (in red font: $d_{nbr}^{BC}=16$, and $d_{oth}^{BC}=16$). FIG. 2C shows a 32-bit Face Pattern Word (FPW) along with 8 frequency bands, each 4-bit unit of which is filled with the orientation bit code (OriCode) representing the maximal orientational response at that band (for example, BT1_L4 means lower 4 bits of Byte 1). FIG. 2D shows an 8-bit Face Pattern Byte (FPB) along with 8 frequency bands.

In the implementation of the present invention, the normalized spatial frequency is used, i.e., $f\in[-0.5, 0.5]$. The range of 8 frequency bands is [0.05, 0.4], where the central frequencies of 8 Gabor filters along the horizontal orientation (i.e., 0°) are [0.0808, 0.0948, 0.1113, 0.1306, 0.1532, 0.1798, 0.2110, 0.2475]. In fact, the 8 frequency bands can be uniquely defined when giving the following three (3) parameters: the number of frequency bands, the number of orientations, and the frequency range. The values of central frequencies are derived from the given three (3) parameters.

In a face recognition approach, the Gabor wavelet transforms (GWT) are performed with a face image at M spatial frequencies (bands) by N orientations, denoted as M×N GWT. Knowing the image size and full orientation range) (0°-180°, the parameters (f, $\sigma_u$, $\sigma_v$, and $\theta$) in Eqs. 2 through 4 can be computed from the specified values of (M, N). An example of 8×16 GWT (i.e., M=8, N=16) is explained as follows. From each face, a total of 128 pairs (magnitudes and phases) of filtered images are extracted with 128 Gabor wavelets (also called Gabor kernels, or Gabor filter banks) distributed along 8 bands (located from low to high frequencies) by 16 orientations in increments of 11.25° (0.00°, 11.25°, 22.50°, ..., 157.50°, 168.75°; see FIG. 2A). The size of each Gabor filter should match the image size being analyzed. The set of 128 Gabor wavelets are only computed once, since all face images (of the same size) have already lined up. Instead of doing spatial convolution, the GWT can be accomplished in the frequency domain by using fast Fourier transforms (FFT) that will significantly speed up the process. To achieve better representation and consistency, the invention uses the "middle frequency bands" in the GWT by excluding the extreme low and extreme high frequency bands.

3. Creation of Face Patterns 3.1 Face Pattern Words

Many GWT coefficients are produced in Section 2, for example, 256 coefficients (128 magnitudes plus 128 phases) per pixel when M=8 and N=16. The key is how to efficiently utilize these GWT coefficients to accomplish a face recognition task.

The FPWs are formed pixel by pixel for each face using at least one set of GWT coefficients. For the example of M=8 and N=16, at each pixel, a 32-bit FPW (double word) is encoded according to the orientational magnitude strength at each frequency. Specifically, at each frequency band (from 1 to 8), the index (0-15) of maximal magnitude among 16 orientations is coded with 4 bits in order to maximize the orientation difference (among subjects in the database). The 4-bit orientational code is input into the FPW by the frequency order, i.e., the lowest (highest) frequency corresponds to the lowest (highest) 4 bits in the 32-bit FPW (see FIG. 2C). Eventually, the FPWs come up with the same dimension of the face image but with the depth of 32 bits. The FPWs are stored as feature vectors in the database, which will be compared with that of the probe face during the identification process.

The procedure to encode the orientation-index numbers (0-15) with binary numbers (referred to as orientation bit code) needs further investigation. Because Hamming Distance (HD) (defined in Eq. (8)) will be computed by checking the bitwise difference between two FPWs, the orientational bit code should favor the HD calculation. The FPWs are designed to reflect the orientational significance (or strength) along with frequency scales (locations). Therefore, the closer (neighboring) orientations should have less bitwise difference, whereas the further (apart) orientations should have more bitwise difference. The nature of the 180°-apart orientations (such as 0° and 180°, 45° and 225°) are actually the same. For example, "Orientation 0") (0°-11.25° is neighboring with both "Orientation 1") (11.25°-22.5° and "Orientation 15" (168.75°-180°, see FIG. 2A). Therefore, each orientation has at least two (2) neighbors. Two inferences from this nature can be made as follows: (i) orientations are circular-neighboring, and (ii) orthogonal (90°-apart) orientations are the furthest orientations. Clearly, the "natural coding" does not favor the HD calculation because the bit-code difference between two neighboring orientations, 0 ("0000B", in binary format) and 15 ("1111B"), is 4 (i.e., the largest HD).

Two cost functions are defined by the following equations. A set of optimal orientation bit code minimizes the HD of all neighboring orientations ($d_{nbr}^{BC}$), and simultaneously maximizes the HD of all orthogonal orientations ($d_{orth}^{BC}$), as follows:

$$d_{nbr}^{BC} = \sum_{n=0}^{N-1} [d_{HD}(O_n^{BC}, O_{n-1}^{BC}) + d_{HD}(O_n^{BC}, O_{n+1}^{BC})], \quad (5)$$

$$d_{orth}^{BC} = \sum_{n=0}^{N-1} [d_{HD}(O_n^{BC}, O_{n+N/2}^{BC})], \quad (6)$$

where $O_n^{BC}$ denotes the orientation bit code (BC) at Orientation n, and N is the total number of orientations (16), remembering the fact of circular neighboring. Thus, set n=N−1 when n<0, and let n=0 when n>N−1.

Only one solution exists for N=4 ($d_{nbr}^{BC}=8$ and $d_{orth}^{BC}=8$), which is [00, 10, 11; 01]. Several solutions are found for N=8 (all having $d_{nbr}^{BC}=16$ and $d_{orth}^{BC}=16$), two of which are listed below, corresponding to Orientation 0-7, respectively; i.e., [110, 100,000, 010, 011, 001, 101, 111] (shown in FIG. 2B and used in Table 1), and [0000, 0010, 0110, 0100, 0101, 0111, 0011, 0001]. Table 1 shows face identification rates (FIR) of different face patterns tested on three (3) databases. One solution of N=16 ($d_{nbr}^{BC}$=32 and $d_{orth}^{BC}$=64) is [1110, 1010, 1000, 1100, 0100, 0110, 0010, 0000, 0001, 0101, 0111, 0011, 1011, 1001, 1101, 1111], as illustrated in FIG. 2A. The solutions given by Eqs. 5 and 6 are referred to as "optimized coding" thereafter. Moreover, the orientation bit code and optimized binary coding of the invention can be utilized for other pattern recognitions, such as fingerprint recognition, iris recognition, and the like.

Figure 3A:
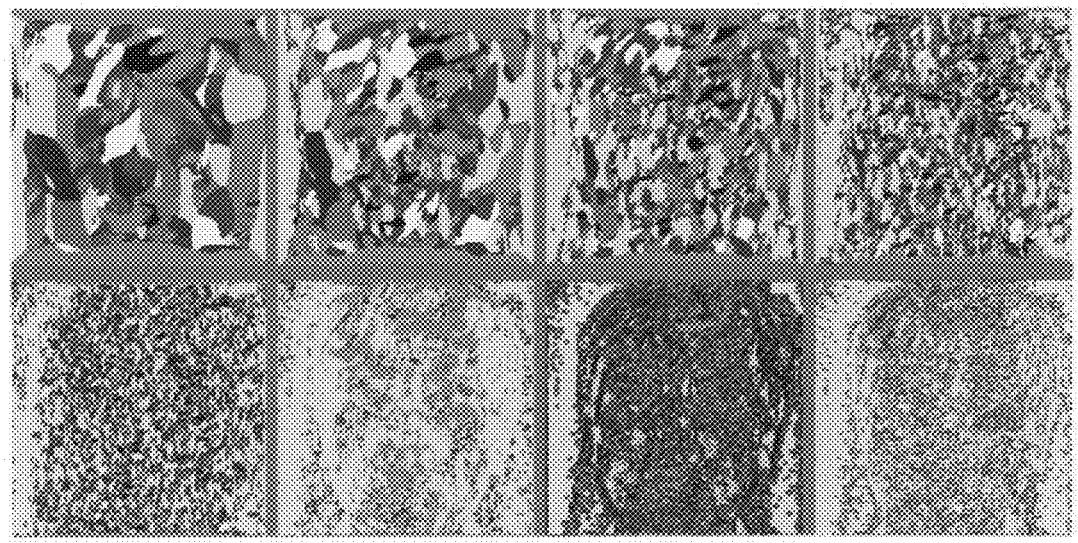
FIG. 3A is a pictorial representation or visualization of face pattern words (FPWs) of the present invention showing the FPW features of the face shown in FIG. 3(a).
Figure 3B:
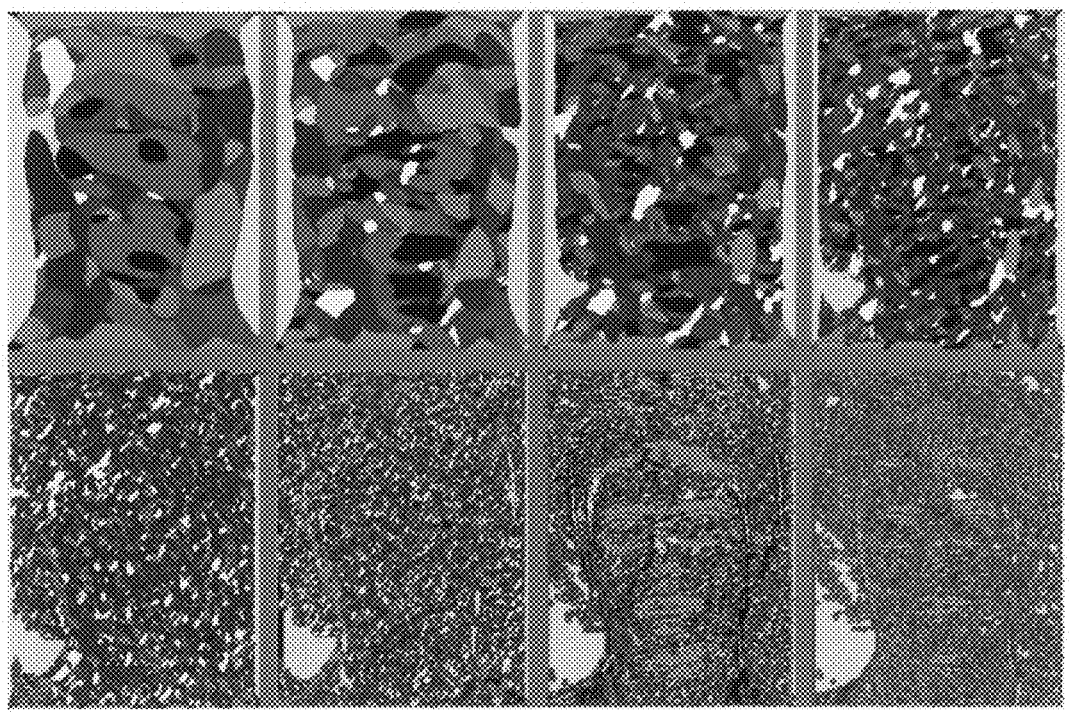
FIG. 3B is a pictorial representation or visualization of face pattern words (FPWs) of the present invention showing the FPW features of the face shown in FIG. 3(c).

Two 32-bit FPWs (M×N=8×16, n=8) of a visible face and of a thermal face are visualized in FIGS. 3A and 3B, where eight 4-bits of FPWs are viewed as 8 images separately. FIG. 3A shows the FPW features of the face shown in FIG. 4(a) (from a thermal database). FIG. 3B shows the FPW features of the face shown in FIG. 4(c) (from a visible database). The 8 panels (top to bottom, left to right) in each sub-figure correspond to the 4-bit orientation code along 8 bands (right to left) as shown in FIG. 2C. The highest 4-bit feature images (at the lower-right corner) show edge-like information due to their correspondences with the highest frequency bands. Refer to FIG. 2A for orientation color code and Table 1 for their performance. Notice that the presented images are scaled. (The FPW features of the face shown in FIG. 4(b) are not shown here.) Notice that the bit significance for each band (i.e., the order of 4-bit bands in a FPW) does not matter for the following HD calculation. These figures (FIGS. 3A and 3B) only provide an intuitive impression of FPWs.

3.2 Face Pattern Bytes

The face pattern bytes (FPBs) are formed pixel by pixel for each face, which can be either directly formed using at least one set of the GWT coefficients, or quickly extracted from the FPWs (if available). First, at each pixel, an M-dimension vector, $V_m$, is created to store the orientation code representing the orientational magnitude strength ($O_{mn}$) at each frequency (refer to Eq. (4a)). The following description of FPB formation takes an example of 8×8 GWT. At each frequency band (from 1 to 8), the index (0-7) of maximal magnitude among 8 orientations is coded with 3 bits ($O^{BC}$, see FIG. 2B) in order to maximize the orientation difference (among subjects in the database). The 3-bit orientational code is first input into an 8-dimension vector ($V_m$) by the frequency order, i.e., the lowest (highest) frequency corresponds to the lowest (highest) index of $V_m$. A face pattern byte (FPB) is then formed with the most frequent orientations (called mode) among some bands (refer to Eqs. (4b-c)). Specifically, the high half-byte (the most significant 4 bits) in an FPB, $FPB_{HHB}$, is the mode of high 4 bands (m=5~8), whereas $FPB_{HHB}$ is the mode of low 4 bands (m=1~4; see FIG. 2D). A factor, $B_{FM}$, is introduced to avoid choosing an orientation code in FPB whose frequency is only 1, so that $B_{FM}$=1 only when the frequency of mode, $f_M$, is greater than or equal to 2; otherwise $B_{FM}$=0 (see Eq. (7d)). For example, $FPB_{HHB}$=0 when there are 4 different orientation codes at high 4 bands (i.e., $f_M$=1). This could make FPB immunized from noise. It is clear that an FPB can code up to 16 orientations (N≤16), but there is no limit to bands (M). Typically, 8 or 16 orientations are sufficient for most applications:

$$V_m = O^{BC}[\text{Index}(\text{Max}(O_{mn}))], \quad (7a)$$

$$FPB_{LHB} = \text{Mode}(V_m|_{m=1\sim M/2}) \cdot B_{FM}, \quad (7b)$$

$$FPB_{HHB} = \text{Mode}(V_m|_{m=M/2+1\sim M}) \cdot B_{FM}, \quad (7c)$$

-continued $$B_{FM} = \begin{cases} 1, & \text{if } f_M \geq 2 \\ 0, & \text{otherwise} \end{cases} \quad (7d)$$

where $O_{mn}$ is the GWT magnitude at Frequency m and Orientation n and m=1~M and n=1~N. The FPBs are stored as feature vectors in the database, which will be compared with that of the probe face during the identification process. A FPB is usually stored in an 8-bit byte, but its valid dimension can be either of 8 bits per pixel (for 8×16 GWT), or of 6 bits per pixel (for 8×8 GWT). For example, the 8-bit FPBs actually comprises 2 sets of 4-bit orientation bit code with optimizing coding.

Figure 4:
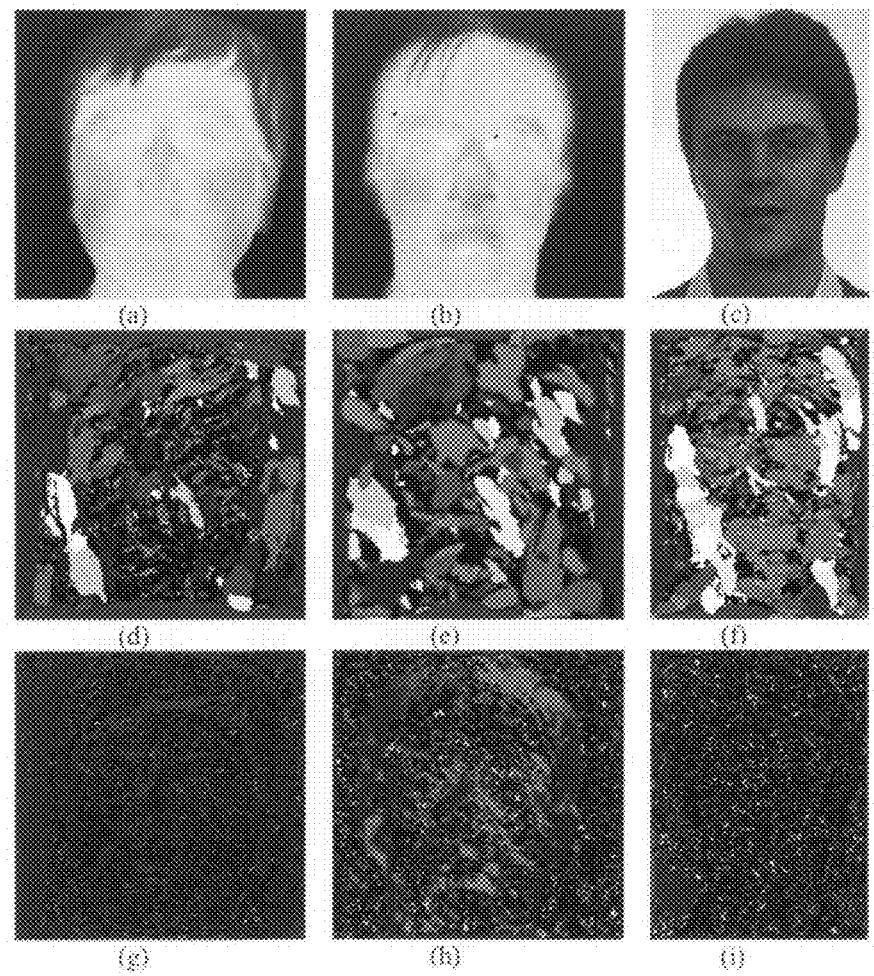
FIG. 4 is a pictorial representation or visualization of face pattern bytes (FPBs) of the present invention showing the FPB features of three sample faces in (a), (b), and (c), respectively.

The face patterns (FPWs and FPBs) are extracted from GWT magnitudes using order statistics, which eliminate redundant information in GWT coefficients (that are floating numbers). Besides the magnitudes, the phase information may also be coded into face patterns. The FPBs (M×N=8×16, n=8) of three sample faces (one sample from each database) are visualized as images in FIG. 4. FIGS. 4(a)-(c) show one face from ASUIR (320×320), UNDIR (160×160), and FERET (232×311) database, respectively. FIGS. 4(d)-(f) show the low half-byte of FPB features. FIGS. 4(g)-(i) show the high half-byte of FPB features. Refer to FIG. 2A for orientation color code and Table 1 for their performance. Notice that the presented images are scaled in FIG. 4.

The embodiments herein are presented using one example of 8-band by 8- or 16-orientation GWT (i.e., M=8, N=8 or 16). Nevertheless, alternative embodiments include FPWs or FPBs that can be formed with the GWT coefficients by different numbers of bands and orientations, for instance, by 4 bands and 8 orientations, or by 4 bands and 16 orientations.

4. Face Identification

The face identification system and method of the invention is accomplished by choosing the "closest" face (of the smallest distance) from the database images with a predefined similarity measure. No user training is needed for such an unsupervised classification procedure. The definition of similarity is related to the face patterns (FPW or FPB) formed in Section 3.

Figure 5:
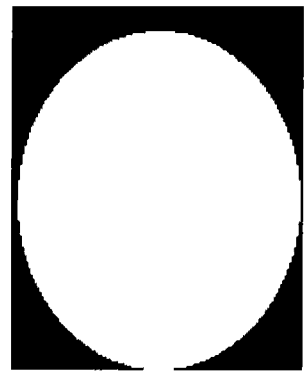
FIG. 5 is a pictorial illustration of the face mask of the present invention.

The Hamming Distance (HD), $d_{HD}$, is used to measure the similarity between two face patterns, $P_1$ and $P_2$, as follows:

$$d_{HD}(P_1, P_2) = \frac{\|(P_1 \otimes P_2) \cap \text{Mask}_{ROI}\|}{\|\text{Mask}_{ROI}\|}, \quad (8)$$

where $\text{Mask}_{ROI}$ is the face mask representing the interested face area. FIG. 5 shows an illustration of the face mask. The size (resolution) of the face mask is the same as that of the face images. The ellipse-like face mask (see FIG. 5) is manually designed to reduce or eliminate the image distractions from hairs or hats, for example. The symbol '⊗' is the Boolean Exclusive-OR (XOR); whereas the symbol '∩' is the Boolean AND operator. The norm operator '∥ ∥' basically counts the number of bits that are ones. Thus, $d_{HD}$ is a fractional number (from 0 to 1) that accounts for the dissimilarity between two faces, so that $d_{HD}$=0 means a perfect match (e.g., for two copies of the same face image).

The purpose of using the face mask ($\text{Mask}_{ROI}$) is to analyze and compare the face patterns (FPWs or FPBs) within the face area only (refer to the bright areas in FIG. 5). For example, a probe face of a subject who has a new hair style (especially for female subjects) or wears a hat is compared with the gallery faces of herself/himself that had different hair appearance(s)

or did not wear any hat. This difference will increase the HD value and may eventually cause a mismatch. As defined in Eq. (8), the face mask ($\text{Mask}_{ROI}$) is logically masked (i.e., ANDed) with the face patterns (FPWs or FPBs), which actually excludes the pattern difference within the dark areas shown in FIG. 5 (where the hair or a hat resides), thereby minimizing or eliminating image distractions.

A new probe face (also referred as a "query face" in the literature) can be identified by choosing the gallery faces (stored in the database) either with the smallest or shortest HDs (used in the experiments—closed-set identification) or with HDs smaller than a specified threshold ($T_{HD}$, useful in open-set identification). According to studies in iris recognition, the HD criterion depends upon the size of the database. In other words, to maintain the same false alarm rate (e.g., one over a million), the HD threshold, $T_{HD}$, decreases with an increasing number of irises in the database. For example, $T_{HD}=0.33$ was suggested for comparing 9.1 million irises; i.e., two irises are considered the same if their $d_{HD}<0.33$. For face recognition, $T_{HD}$ can be decided after analyzing a large number of faces.

Although the present face patterns (FPWs or FPBs) are of the same two dimensions as the original face image, the calculation of $d_{HD}$ can be very fast. The Boolean operations (XOR, AND) between two face patterns (up to 32 bits per pixel for FPW) can be completed in a single machine instruction on a 32-bit platform (hardware and software). All face patterns in the database are pre-computed and stored in memory and the denominator in Eq. (8) is fixed for all comparisons. Therefore, the face matching process by using FPW or FPB can be very fast. Considering that result, multiple FPB patterns can be put into one double word (32 bits) so that the HD calculations can be fully implemented by the hardware and a real-time face recognition system using the system and method of the present invention (FPW and/or FPB plus HD) may be realized.

5. Experimental Results

The face patterns formed with orientation code were originally proposed for thermal (LWIR) face recognition. Two thermal face databases (ASUIR, UNDIR) and one visible face database (FERET) were tested in multiple experiments. The "ASUIR Database" (collected by Alcorn State University) currently consists of infrared face images (i.e., LWIR) from 45 subjects. The ASUIR images were taken under mixed conditions (such as daytime vs. nighttime, lighting vs. no-lighting), by a FLIR SC620 camera (640×480 pixel original resolution and 7.5~13 μm spectral range). The "UNDIR Database" (collected by the University of Notre Dame) includes the infrared face images (312×239 pixel original resolution) from 82 subjects. The "FERET Database" contains visible face images (256×384 pixel original resolution), where 200 images from 100 subjects were randomly selected for testing.

Three databases were tested separately. For each database, two frontal face images were randomly selected from each subject and the two images were used as a probe image and a gallery image, respectively. All images in each database were normalized. The face portion was then detected and extracted. The size of an extracted face was usually smaller than the resolution of the original image in the database (refer to FIG. 4). Next, all faces were automatically lined up. For each image, the face patterns (FPWs, FPBs) were created by GWT and optimized orientation coding. In fact, FPBs could be extracted from the FPWs. All face patterns were then ANDed with the face mask. The HDs were finally computed and compared between the face patterns of a probe image and the face patterns of each gallery image in the database. The face identification rate (FIR) is the percentage of correctly-identified images (or subjects) against the total number of images (subjects) in the entire database. The experimental results of two face patterns (using "Optimized Coding") tested on three databases are presented in Table 1, where only the top-1 match results (the shortest HD distance) were reported.

In order to obtain a comparison with a classical face recognition algorithm, a PCA (eigenface) recognition algorithm (using Euclidian distance) was tested with three databases. Taking one image from each subject formed a train subset and the rest of the images formed a test subset. Switching the train subset and the test subset provided one additional test. The PCA results shown in Table 1 were the average of these two tests. It is clear that the PCA performance results are far poorer than the orientation-based face recognition algorithm of the FPW or FPB system and method of the present invention.

From the results shown in Table 1, the following facts are observed: (i) on the ASUIR database, FPW (8×16) has the best performance (98.88%), and the results of (8×16 GWT) are better than that (8×8); (ii) on the UNDIR database, FPW (8×8) is the best (92.68%), and the results of (8×8) are better than that (8×16); (iii) on the FERET database, FPW (8×8) performs the best (90.00%), and the results of (8×8) are better than that (8×16); (iv) the differences between FPW and FPB on thermal databases (ASUIR, UNDIR) are smaller than those on the visible database (FERET); and (v) 16 orientations of GWT is better for high-resolution face images (like ASUIR), whereas 8 orientations of GWT is better for low-resolution images (like UNDIR and FERET).

Overall, the experimental results showed that the orientation-based face recognition algorithms (FPW and FPB) are very successful. On thermal databases (ASUIR, UNDIR), FPB (8×8) has equivalent performance (97.75% and 92.67%) compared to FPW, but its dimensionality (4 or 3 bits per pixel) is greatly reduced in contrast to FPW (32 or 24 bits per pixel), which is very beneficial to fast face matching (less time) and efficient feature storage (less memory). The differences on three databases suggest that high image resolution helps improve the recognition rate, which is also related to the choice of (M×N) in GWT. Further, the face recognition results on two thermal (IR) databases were better than on the visible database. One possible reason for this result is that all thermal images have consistent contrast regardless of illumination conditions. The higher performance on ASUIR than on UNDIR is also due to a better camera (FLIR SC620) used for image acquisition for ASUIR (refer to FIGS. 4(a) and 4(b)).

The face recognition results of FPW using "natural coding" are given in Table 2, which shows that the "optimized coding" is superior to "natural coding" in terms of identification rate. Table 2 shows FPW performance comparison of optimized coding versus natural coding. For example, the FIR of FPW (8×16) using "natural coding" is only 94.44%, which is lower than that of FPW (8×16) using "optimized coding" (98.88%).

These orientation-based face recognition algorithms are not space-invariant. Accurate image registration and polar coordinate GWT may help improve their performance.

6. Summary

The identification rates using the novel face patterns, FPWs and FPBs (with "Optimized Coding"), are very high—up to 98.88% for FPW on thermal imagery. The performance of FPWs and FPBs of the present invention are much higher than the results of the PCA algorithm.

Although the FPWs are of the same 2D dimension as the face image, the calculation of $d_{HD}$ (Hamming Distance) is very efficient. The Boolean operations (XOR, AND) between two 32-bit FPWs (at a pixel) can be completed in a single machine instruction. In addition, multiple FPBs may be stored in a 32-bit word (like a FPW). All FPWs or FPBs in the database are already calculated and stored, and the denominator in Eq. (8) is also fixed for all comparisons. Therefore, these factors combine to empower a fast and efficient process in face matching against a large database. The techniques and system and method of the present invention may also be implemented by using special hardware to meet the needs of real-time face recognition applications. A computer-readable medium with instructions for controlling a computer-based system for face identification and recognition implements the method and system of the invention.

The present invention has for the first time described and fully characterized a novel system and method for face recognition using facial features where the system and method create and utilize face pattern words and face pattern bytes. Moreover, the invention provides a novel means for face identification based on visible and/or thermal images using computer software.

The above detailed description is presented to enable any person skilled in the art to make and use the invention. Specific details have been disclosed to provide a comprehensive understanding of the present invention and are used for explanation of the information provided. These specific details, however, are not required to practice the invention, as is apparent to one skilled in the art. Descriptions of specific applications, analyses, and calculations are meant to serve only as representative examples. Various suitable changes, modifications, combinations, and equivalents to the preferred embodiments may be readily apparent to one skilled in the art and the general principles defined herein may be applicable to other embodiments and applications while still remaining within the spirit and scope of the invention. The claims and specification should not be construed to unduly narrow the complete scope of protection to which the present invention is entitled. Moreover, the terminology used herein is for the purpose of such description and not of limitation. It should also be understood that the figures are presented for example purposes only. No intention exists for the present invention to be limited to the embodiments shown and the invention is to be accorded the widest possible scope consistent with the principles and features disclosed herein.

REFERENCES

[1] Yufeng Zheng, "Orientation-based face recognition using multispectral imagery and score fusion", Optical Engineering 50 (117202), November 2011.
[2] Yufeng Zheng, Adel Elmaghraby, "A Brief Survey on Multispectral Face Recognition and Multimodal Score Fusion," (keynote speaker) IEEE ISSPIT 2011, Dec. 14-17, 2011, Bilbao, Spain.
[3] Yufeng Zheng, "Face detection and eyeglasses detection for thermal face recognition," IS&T/SPIE Electronic Imaging Conference, 22-26 Jan. 2012 in Burlingame, Calif., United States.
[4] Yufeng Zheng, "An Orientation-based Face Recognition Algorithm", The IASTED International Conference on Computer Vision 2011, Vancouver, BC, Canada (2011).
[5] Yufeng Zheng, "A Novel Orientation Code for Face Recognition", Proc. SPIE 8056, 805606 (2011), Orlando, USA.
[6] Yufeng Zheng, "A Novel Thermal Face Recognition Approach Using Face Pattern Words", Proc. SPIE, Vol. 7667, 766703 (2010), Orlando, USA.

TABLE 1

| Database (Resolution) | FPW (%) | | FPB (%) | | PCA (%) |
|---|---|---|---|---|---|
| | 8 × 16 (32 b)[a] | 8 × 8 (24 b) | 8 × 16 (8 b) | 8 × 8 (6 b) | |
| ASUIR (320 × 320) (45 subjects/90 images) | 98.88 | 97.88 | 97.75 | 97.75 | 75.56 |
| UNDIR (160 × 160) (82 Subjects/164 Images) | 91.46 | 92.68 | 89.63 | 92.67 | 57.00 |
| FERET (232 × 311) (100 Subjects/200 Images) | 89.50 | 90.00 | 83.50 | 85.50 | 58.80 |

[a]8 × 16 (32 b) means a 32-bit FPW was resulted from the GWT of 8 bands by 16 orientations.

TABLE 2

| Database (Resolution) | FPW - Optimized Coding | | FPW - Natural Coding | |
|---|---|---|---|---|
| | 8 × 16 (32 b) | 8 × 8 (24 b) | 8 × 16 (8 b) | 8 × 8 (6 b) |
| ASUIR (320 × 320) (45 subjects/90 images) | 98.88 | 97.88 | 94.44 | 93.33 |
| FERET (232 × 311) (100 Subjects/200 Images) | 89.50 | 90.00 | 88.50 | 89.00 |

What is claimed is:

1. A method for face recognition and identification, the method comprising:
receiving at least one probe face image and at least one gallery face image of a subject to be identified, wherein the at least one probe face image is a real-time image and the at least one gallery face image is an image from a pre-existing image database and not a real-time image;
preprocessing the at least one probe face image and the at least one gallery face image;
normalizing the at least one probe face image and the at least one gallery face image to obtain a consistent dynamic image range,
wherein the at least one probe face image is a thermal image or a visible face image and wherein the at least one gallery face images is a thermal face image or a visible face image;
creating at least one set of face patterns comprising face pattern words (FPWs) or face pattern bytes (FPBs) using at least one set of Gabor wavelet transform (GWT) coefficients with each probe face image and gallery face image,
wherein the creation of FPWs comprises the maximal magnitude of the GWT coefficients and wherein the creation of FPBs comprises the maximal magnitude of the GWT coefficients;
calculating the Hamming Distance between the at least one probe face image and the at least one gallery face image using the FPWs or FPBs and a face mask,
wherein the face mask in the calculation of the Hamming Distance is used to minimize or to eliminate non-face image distractions; and
identifying a subject by using the Hamming Distance calculated from FPWs or FPBs,
wherein the method utilizes at least one processor for receiving, preprocessing, and normalizing the images, for creating the at least one set of face patterns comprising the FPWs or FPBs, for calculating the Hamming Distance, and for identifying a subject.

2. The method of claim 1, wherein the subject is identified using the smallest Hamming Distance between the at least one probe face image and the at least one gallery face image.

3. The method of claim 2, wherein the at least one probe face image and the at least one gallery face image are both visible face images or the at least one probe face image and the at least one gallery face image are both thermal face images, and wherein the at least one gallery face image is of one or more subjects and is stored in a database prior to face recognition.

4. The method of claim 2, wherein the FPWs or FPBs are masked with the face mask in the calculation of the Hamming Distance to minimize or eliminate image distractions.

5. The method of claim 1, wherein the creation of FPWs is pixel by pixel for each probe and gallery face image and comprises using at least one configuration of the GWT coefficients.

6. The method of claim 5, wherein the creation of FPWs comprises the maximal magnitude of the GWT coefficients of sixteen orientations at each frequency band of a total of eight frequency bands.

7. The method of claim 6, wherein the eight central frequencies of the eight frequency bands are 0.0808, 0.0948, 0.1113, 0.1306, 0.1532, 0.1798, 0.2110, and 0.2475, and wherein the frequencies are normalized spatial frequencies.

8. The method of claim 6, wherein the creation of FPWs comprises eight sets of 4-bit orientation bit code with optimized binary coding and wherein each set of 4-bit orientation bit code corresponds to the index of a selected orientation at each frequency band.

9. The method of claim 8, wherein the orientation bit code with optimized binary coding can be used for other pattern recognitions.

10. The method of claim 1, wherein the creation of FPBs is pixel by pixel for each probe and gallery face image and comprises using at least one configuration of the GWT coefficients.

11. The method of claim 1, wherein the creation of FPBs is pixel by pixel for each probe and gallery face image and comprises using at least one FPW.

12. The method of claim 1, wherein the creation of FPBs comprises the maximal magnitude of the GWT coefficients of sixteen orientations at each frequency band of a total of eight frequency bands.

13. The method of claim 12, wherein the eight central frequencies of the eight frequency bands are 0.0808, 0.0948, 0.1113, 0.1306, 0.1532, 0.1798, 0.2110, and 0.2475, and wherein the frequencies are normalized spatial frequencies.

14. The method of claim 12, wherein the creation of FPBs comprises two sets of 4-bit orientation bit code with optimized binary coding.

15. The method of claim 14, wherein each set of 4-bit orientation bit code corresponds to the index of a selected orientation at each frequency band and wherein the selected orientation is the mode of low four bands or high four bands.

16. A method for face recognition and identification, the method comprising:
receiving at least one probe face image and at least one gallery face image of a subject to be identified, wherein the at least one probe face image is a real-time image and the at least one gallery face image is an image from a pre-existing image database and not a real-time image;
preprocessing the at least one probe face image and the at least one gallery face image;
normalizing the at least one probe face image and the at least one gallery face image to obtain a consistent dynamic image range;
creating at least one set of face patterns comprising face pattern words (FPWs) or face pattern bytes (FPBs) using at least one set of Gabor wavelet transform (GWT) coefficients with each probe face image and gallery face image,
wherein the at least one probe face image is a thermal face image or a visible face image and wherein the at least one gallery face image is a thermal face image or a visible face image, and
wherein the creation of FPWs and FPBs is pixel by pixel for each probe and gallery face image and comprises using at least one configuration of the GWT coefficients and further comprises eight sets and two sets, respectively, of 4-bit orientation bit code with optimized binary coding;
calculating the Hamming Distance between the at least one probe face image and the at least one gallery face image using the FPWs or FPBs and a face mask;
optimizing the orientation bit code by minimizing the Hamming Distance between all neighboring orientations and maximizing the Hamming Distance between all orthogonal orientations; and
identifying a subject by using the Hamming Distance calculated from the FPWs or FPBs,
wherein the method utilizes at least one processor for receiving, preprocessing, and normalizing the images, for creating the at least one set of face patterns comprising the FPWs or FPBs, for calculating the Hamming Distance, for optimizing the orientation bit code, and for identifying a subject.

17. The method of claim 16, wherein the number of neighboring orientations is two or more.

18. A non-transitory computer-readable medium comprised of computer processor-based instructions that utilize the method of claim 16 to instruct a computer-based device for face recognition and identification.

19. The medium of claim 18, wherein the at least one probe face image is a thermal face image or a visible face image and wherein the at least one gallery face image is a thermal face image or a visible face image.

20. The medium of claim 19, wherein the subject is identified using the smallest Hamming Distance between the at least one probe face image and the at least one gallery face image.

21. The medium of claim 20, wherein the at least one probe face image and the at least one gallery face image are both visible face images or the at least one probe face image and the at least one gallery face image are both thermal face images, and wherein the at least one gallery face image is of one or more subjects and is stored in a database prior to face recognition.

22. The medium of claim 20, wherein the FPWs or FPBs are masked with the face mask in the calculation of the Hamming Distance to minimize or eliminate image distractions.

23. The medium of claim 18, wherein the creation of FPWs is pixel by pixel for each probe and gallery face image and comprises using at least one configuration of the GWT coefficients.

24. The medium of claim 23, wherein the creation of FPWs comprises the maximal magnitude of the GWT coefficients of sixteen orientations at each frequency band of a total of eight frequency bands.

25. The medium of claim 24, wherein the eight central frequencies of the eight frequency bands are 0.0808, 0.0948, 0.1113, 0.1306, 0.1532, 0.1798, 0.2110, and 0.2475, and wherein the frequencies are normalized spatial frequencies.

26. The medium of claim 24, wherein the creation of FPWs comprises eight sets of 4-bit orientation bit code with optimized binary coding and wherein each set of 4-bit orientation bit code corresponds to the index of a selected orientation at each frequency band.

27. The medium of claim 26, wherein the orientation bit code with optimized binary coding can be used for other pattern recognitions.

28. The medium of claim 18, wherein the creation of FPBs is pixel by pixel for each probe and gallery face image and comprises using at least one configuration of the GWT coefficients.

29. The medium of claim 18, wherein the creation of FPBs is pixel by pixel for each probe and gallery face image and comprises using at least one FPW.

30. The medium of claim 18, wherein the creation of FPBs comprises the maximal magnitude of the GWT coefficients of sixteen orientations at each frequency band of a total of eight frequency bands.

31. The medium of claim 30, wherein the eight central frequencies of the eight frequency bands are 0.0808, 0.0948, 0.1113, 0.1306, 0.1532, 0.1798, 0.2110, and 0.2475, and wherein the frequencies are normalized spatial frequencies.

32. The medium of claim 30, wherein the creation of FPBs comprises two sets of 4-bit orientation bit code with optimized binary coding.

33. The medium of claim 32, wherein each set of 4-bit orientation bit code corresponds to the index of a selected orientation at each frequency band and wherein the selected orientation is the mode of low four bands or high four bands.

34. The medium of claim 18, wherein the number of neighboring orientations is two or more.

35. A system for face recognition and identification, the system comprising:

means for receiving at least one probe face image and at least one gallery face image of a subject to be identified, wherein the at least one probe face image is a real-time image and the at least one gallery face image is an image from a pre-existing image database and not a real-time image;

a pre-existing image database containing the at least one gallery face image;

means for preprocessing the at least one probe face image and the at least one gallery face image;

means for normalizing the at least one probe face image and the at least one gallery face image to obtain a consistent dynamic image range;

means for creating at least one set of face patterns comprising face pattern words (FPWs) or face pattern bytes (FPBs) using at least one set of Gabor wavelet transform (GWT) coefficients with each probe face image and gallery face image, wherein the at least one probe face image is a thermal face image or a visible face image and wherein the at least one gallery face image is a thermal face image or a visible face image, and wherein the creation of FPWs and FPBs is pixel by pixel for each probe and gallery face image and comprises using at least one configuration of the GWT coefficients and further comprises eight sets and two sets, respectively, of 4-bit orientation bit code with optimized binary coding;

means for calculating the Hamming Distance between the at least one probe face and the at least one gallery face using the FPWs or FPBs and a face mask;

means for optimizing the orientation bit code by minimizing the Hamming Distance between all neighboring orientations and maximizing the Hamming Distance between all orthogonal orientations; and means for identifying a subject by using the Hamming Distance calculated from the FPWs or FPBs, wherein the system utilizes at least one processor for the means for receiving, preprocessing, and normalizing the images, for the means for creating the at least one set of face patterns comprising the FPWs or FPBs, for the means for calculating the Hamming Distance, for the means for optimizing the orientation bit code, and for the means for identifying a subject.

* * * * *